April 26, 1927.

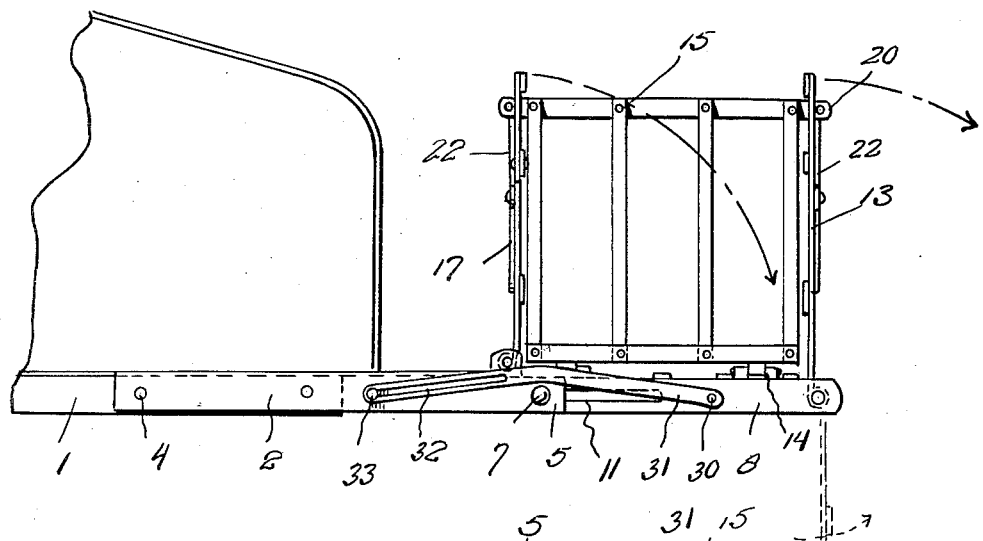
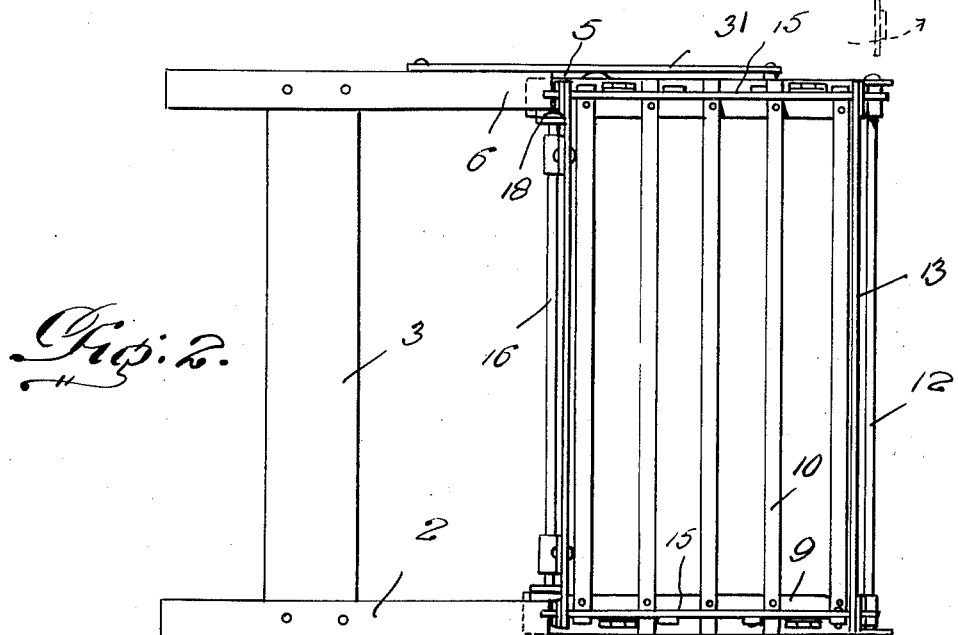

J. HYDE 1,625,808

LUGGAGE CARRIER

Filed Nov. 14, 1925  2 Sheets-Sheet 2

Inventor
John Hyde
By Clarence A. O'Brien
Attorney

Patented Apr. 26, 1927.

1,625,808

UNITED STATES PATENT OFFICE.

JOHN HYDE, OF ALBION TOWNSHIP, RENO COUNTY, KANSAS.

LUGGAGE CARRIER.

Application filed November 14, 1925. Serial No. 69,141.

My present invention pertains to luggage carriers; and it has for its object the provision of a luggage carrier for use at the rear end of an automobile; the said carrier being characterized by the capacity of being folded and being positioned when not in use so as not to afford a rest on which children can steal rides, and being also characterized by adaptability to be readily set up for use, and loaded and unloaded with great facility.

Other objects and practical advantages of the invention will be fully understood from the following description and claims when the same are read in connection with the drawings, accompanying and forming part of this specification, in which:—

Figure 1 is a side elevation showing the preferred embodiment of my invention as the same appears when set up ready for use.

Figure 2 is a top plan view of my improvement per se.

Similar numerals of reference designate corresponding parts in all of the views of the drawings.

Figure 3:
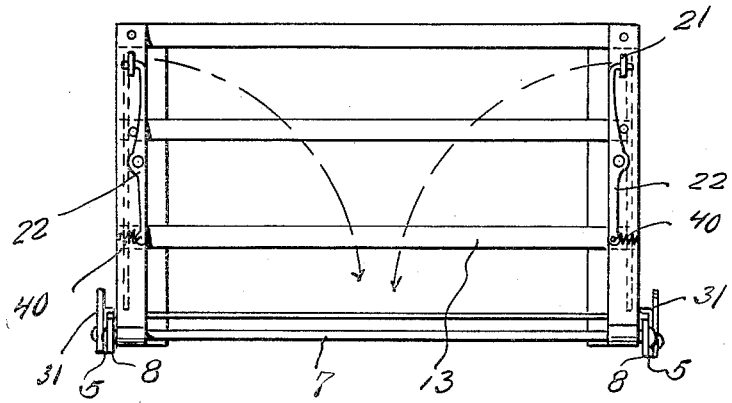
Figure 3 is a rear elevation of the improvement.

I show in Figure 1 a portion of an automobile including side chassis bars 1, and in said figure, I also show my improvement as properly arranged relative to the automobile, the major portion of the improvement being carried in rear of the automobile body as shown.

Among other elements my improvement comprises angle bars 2, connected together by a cross bar 3, and designed to be appropriately fixed at 4 to the said chassis bars of the automobile. The vertical portions of the bars 2, which vertical portions are designated by 5 are extended rearwardly about the proportional distance illustrated beyond the horizontal portion 6 of the bars, Figure 2. Mounted in the said vertically disposed extended portions 5 of the bars 2 is a transverse rod 7 which constitutes an important feature of the device.

In addition to the said angle bars 2, my improvement includes a receptacle having among other elements side bars 8 on which are inwardly extending flanges 9, the said flanges 9 serving for the connection of slats 10 which serve in connection with the side bars 8 to form the bottom of the luggage carrier receptacle. In the said side bars 8 of the receptacle are longitudinal slots 11 which loosely receive the before mentioned rod 7. Mounted in the rear end portions of the bars 8 of the receptacle bottom is a transverse rod 12, and carried by the said transverse rod 12 is the back wall 13 of the receptacle, said back wall being preferably of open work construction as illustrated. Hingedly connected at 14 to the side bars 8 are the foldable side walls 15 of the receptacle, and carried by a transverse rod 16, is the foldable front wall 17 of Figure 2. At this point I would have it understood that the transverse rod 16 is mounted in upright ears 18 on the rear portions of the flanges 9 of the side bars 8. Adjacent to their free edges the side walls 15 are provided with apertured extensions 20, designed to be extended through apertures 21 in the walls 13 and 17 and be engaged by fasteners 22 on said walls 13 and 17, so as to detachably connect the walls together when relatively arranged as shown in Figures 1 and 2 with a view to precluding casual folding or collapse of the carrier receptacle.

The bars 8 are extended forwardly of the transverse rod 7 located in the center of movement of the novel luggage carrier, and hence it will be understood that when the carrier is set up ready for use, as in Figures 1 and 2, the forward portions of the bars 8 will bear upwardly against the horizontal portions of the bars 2 so as to maintain the receptacle of the carrier in horizontal position as illustrated.

Arranged at opposite sides of the bars 2 and also arranged at opposite sides of the bars 8 and pivotally connected at 30 to the latter are bars 31 adapted to swing on the centers 30 and having longitudinal slots 32 for the reception of headed pins 33, extending laterally from the vertical portion of the bars 2. The bars 31 connected and arranged as described constitute an important part of my invention inasmuch as they permit of the receptacle when folded being swung from the position shown in Figure 1 to that shown in Figures 4 and 5 and vice versa, the bottom of the receptacle being disposed horizontally when the receptacle is positioned as shown in Figure 1, and being disposed vertically when the receptacle is positioned as in Figure 4. By reason of the slots 11 in the bars 8 receiving the transverse rod 7, and said slots 11 being relatively arranged as shown, it will be manifest that when the receptacle is positioned as shown in Figure 4, the major portion of the weight of the receptacle will be below the rod 7, and hence the receptacle will be maintained in said position as shown in Figure 4 against accidental movement.

Figure 5:
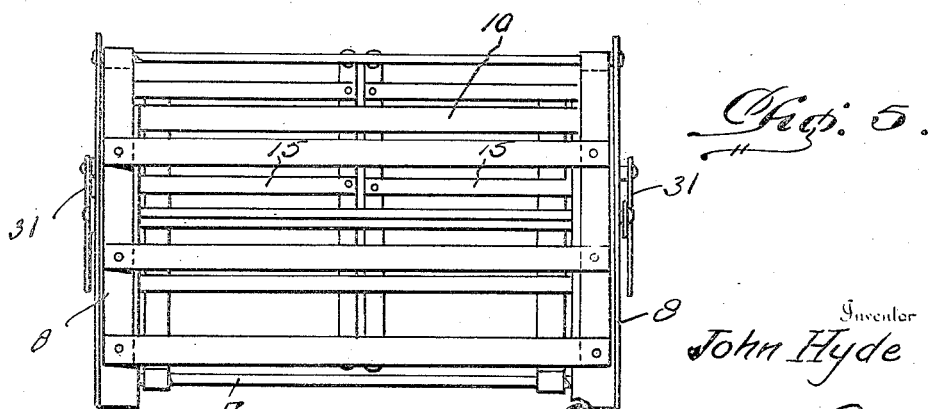
Figure 5 is a rear elevation showing the carrier in its idle position.

As will be readily understood from Figure 1, the front wall and the back wall of the receptacle comprised in my improvement are adapted to be swung rearwardly and downwardly after the manner indicated by the arrows in said figure, and by reference to Figure 5 it will be noted that when the receptacle is in pendent position the side walls of the receptacle folded inwardly against the bottom will rest within the back wall which at that time will be in pendent position. The catches 22 are spring-pressed as designated by 40, Figure 3, and therefore, when the receptacle is in pendent position the catches complementary to the back wall of the receptacle may be utilized to detachably fasten said back wall to the bars 8.

It will also be gathered from the foregoing that the back wall of the receptacle when the carrier is in working position, may be swung downwardly while the front wall and the side walls are retained in upright position, this to facilitate loading of the carrier, and in this connection it will also be manifest that after loading of the carrier the back wall may be expeditiously and easily positioned as shown in Figure 1 and detachably secured in such position by the fasteners or catches 22.

Figure 4:
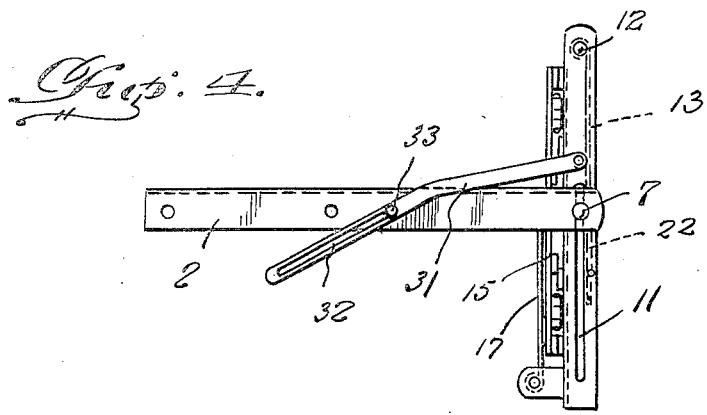
Figure 4 is a side elevation showing the improvement in the state in which it is placed when idle.

When the receptacle is swung from the idle position shown in Figures 4 and 5 to horizontal position the rear portions of the bars 8 will bear upwardly against the forward end portion of the horizontal parts of the bars 2, and hence the rear portion of the carrier receptacle will be maintained in a strong manner against downward movement.

I would have it understood here that the receptacle is adjusted from the position shown in Figure 4 to that shown in Figure 1 while the receptacle is in folded state, and subsequent to the described positioning of the bars 8, the front wall, back wall, and side walls of the receptacle are placed in upright position and are interlocked and fastened so as to constitute the convenient receptacle illustrated.

Manifestly when arranged as shown in Figures 4 and 5, the receptacle portion of the improvement will not render the rear portion of the automobile unsightly and it will also be appreciated that when turned in the manner indicated, the receptacle will not offer any place on which children can seat to steal a ride.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of the elements as disclosed, my invention being defined by my appended claims within the scope of which changes in structure and relative arrangement may be made without departure from my invention.

Having described my invention, what I claim and desire to secure by Letters-Patent, is:—

1. A luggage carrier comprising a frame, and a foldable receptacle carried by and adjustable relative to the frame from a working position to a vertical or substantially vertical position with a portion below the point of suspension of the receptacle, the said receptacle being made up of a bottom wall and hingedly connected upright walls, and the said upright walls being capable of being folded precedent to shifting of the receptacle to upright position and being also capable of being restored to upright position when the receptacle is positioned horizontally.

2. A luggage carrier comprising a frame, and a foldable receptacle carried by and adjustable relative to the frame from a working position to a vertical or substantially vertical position, the said receptacle being made up of a bottom wall and hingedly connected upright walls, and the said upright walls being capable of being folded precedent to shifting of the receptacle to upright position and being also capable of being restored to upright position when the receptacle is positioned horizontally; the receptacle being capable of gravitational movement when in folded state and substantially vertical position whereby when idle the major portion of the receptacle will be located below the point of suspension of the receptacle.

3. In a luggage carrier, the combination of longitudinal frame bars having vertically disposed portions and horizontally disposed portions, the vertical portions extending in rear of the horizontal portions, a receptacle made up of side bars hingedly connected at intermediate points in their length to the frame bars and adapted when positioned to bear upwardly against the horizontal portions of the frame bars, means cooperating with the said side bars to form the receptacle body, a front wall, side walls, and a back wall hingedly connected with said side bars, means for securing said front, side and back walls detachably in working position, and bars pivotally connected to the side bars of the receptacle and having slots receiving projections on the frame bars, the said side bars of the receptacle having limited longitudinal movement with respect to the frame bars.

4. A luggage carrier comprising frame bars spaced apart and each having a horizontally disposed portion and a vertically disposed portion extending rearwardly beyond the horizontally disposed portion, a receptacle having side bars with longitudinal slots, pivotally connected with the frame bars by connections disposed in said slots, said side bars being arranged alongside the vertically disposed portion of the frame bars and swingable to and from positions under the horizontally disposed portion of the frame bars, and foldable parts carried by the said longitudinally slotted bars and adapted when said bars are in upright positions to rest in rear of the horizontally disposed portion of the frame bars.

5. A luggage carrier comprising frame bars with vertical portions and horizontal portions, the vertical portions extending rearwardly beyond the horizontal portions, longitudinally slotted bars pivotally connected to the said extended vertical portions of the frame bars, a receptacle carried by the said slotted bars, and made up of a bottom wall fixed to said slotted bars, and a front wall, a back wall and side walls hingedly connected with the said slotted bars and adapted to be detachably secured in working position.

6. A luggage carrier comprising frame bars with vertical portions and horizontal portions, the vertical portions extending rearwardly beyond the horizontal portions, longitudinally slotted bars pivotally connected to the said extended vertical portions of the frame bars, a receptacle carried by the said slotted bars, and made up of a bottom wall fixed to said slotted bars, and a front wall, a back wall and side walls hingedly connected with the said slotted bars and adapted to be detachably secured in working position; the receptacle when folded and arranged in upright position being adapted to rest with its major portion below its point of suspension.

7. A luggage carrier comprising frame bars having horizontal portions and vertical portions extending rearwardly of said horizontal portions, longitudinally slotted side bars hingedly and adjustably connected to the frame bars by means extending through said slots, said side bars having vertical portions and horizontal portions, side walls hingedly connected to the horizontal portions of the slotted side bars, a front wall and a back wall hingedly connected with vertical portions of said slotted bars, means for detachably securing said front, back and side walls in working position, and bars pivotally connected to the side bars and having longitudinal slots receiving projections on the bars.

In testimony whereof 1 affix my signature.

JOHN HYDE.